United States Patent [19]
Doppstadt

[11] Patent Number: 4,927,528
[45] Date of Patent: May 22, 1990

[54] SIEVE DEVICE FOR SIEVING OUT COMPOST FROM ROTTEN ORGANIC MATERIAL

[76] Inventor: Werner Doppstadt, Vossnacker Strasse 67, 5620 Velbert-Langenberg, Fed. Rep. of Germany

[21] Appl. No.: 323,139

[22] Filed: Mar. 13, 1989

Related U.S. Application Data

[63] Continuation of Ser. No. 135,663, Dec. 21, 1987, abandoned.

[30] Foreign Application Priority Data

Dec. 23, 1986 [DE] Fed. Rep. of Germany ....... 3644146

[51] Int. Cl.⁵ .............................................. C05F 9/02
[52] U.S. Cl. ..................................... 209/240; 209/241; 209/12; 209/683; 209/247; 209/257; 209/284; 209/291; 209/421
[58] Field of Search ...................... 209/38, 39, 12, 683, 209/215, 231, 240, 241, 244, 247, 257, 284, 288, 289, 291, 297, 369, 389, 390, 392, 411, 420, 421; 280/97

[56] References Cited

U.S. PATENT DOCUMENTS

| | | | |
|---|---|---|---|
| 758,032 | 4/1904 | Hill | 209/284 |
| 784,618 | 3/1905 | Griffis | 209/420 |
| 856,894 | 6/1907 | Merrell | 209/411 |
| 877,462 | 1/1908 | Howell | 209/288 |
| 3,439,937 | 4/1969 | Dixon | 280/97 |
| 3,709,360 | 1/1973 | Baker | 209/215 |
| 3,973,736 | 8/1976 | Nilsson | 209/12 |
| 4,031,005 | 6/1977 | Der | 209/284 |
| 4,136,832 | 1/1979 | Morita et al. | 209/288 |
| 4,254,878 | 3/1981 | Marsh | 209/683 |
| 4,261,816 | 4/1981 | Beck et al. | 209/284 |
| 4,445,906 | 5/1984 | Riemann et al. | 209/289 |
| 4,469,230 | 9/1984 | Gorlitz et al. | 209/369 |
| 4,587,745 | 5/1986 | Tanner | 209/288 |

*Primary Examiner*—Andres Kashnikow
*Assistant Examiner*—Mark T. Le
*Attorney, Agent, or Firm*—Lee, Mann, Smith, McWilliams & Sweeney

[57] ABSTRACT

The sieve device comprises a filling funnel for feeding the material. A conveyor belt runs on the bottom of the filling funnel. The conveyor belt projects into a sieve drum, which is driven by a hydraulic motor. The material is transported through the sieve drum by a helical conveying ledge. Fine-grained elements of the material fall onto a conveyor belt extending below the sieve drum and are carried out to the side through conveyor belts extending at an angle. Coarse parts of the material are carried out at the rear end of the sieve drum through a conveyor belt.

36 Claims, 6 Drawing Sheets

SIEVE DEVICE FOR SIEVING OUT COMPOST FROM ROTTEN ORGANIC MATERIAL

This application is a continuation of application Ser. No. 07/135,663 filed Dec. 21, 1987 now abandoned.

The invention relates to a sieve device for sieving out compost from rotten organic material.

Large quantities of organic waste develops in the forestry, in municipal corporations or road building and maintenance authorities, for example waste wood when road trees are trimmed, wastes from cemeteries or also waste woods from the disposal of bulky goods or the household rubbish. It is desirable not to burn such waste wood or to feed it to a garbage incineration facility but to compost it for generating natural humus. The environment is heavily burdened by garbage incineration. Besides burning in a garbage incineration facility involves considerable costs. Therefore it is known to comminute waste wood and to pit it such that it changes into humus by natural decomposition. To accelerate the rotting, rotting-stimulating agents, for example lime nitrogen are added to the comminuted organic wastes.

German patent document No. 3,517,684 describes a composting device for comminuting organic waste, in particular wood. This composting device has a trough shaped container adapted to be placed on a truck. A conveying device is arranged on the bottom of this container and conveys material to one end of this container. An impact mechanism closes the container at the rear end.

The comminution of the organic wastes results in pieces of different size. Consequently the rotting period of such different size pieces in the stacks is correspondingly different. Also different kinds of wood have different rotting periods. If, therefore, the stacks are further processed after some time, generally not yet all of the material will have been changed into useful humus. On the contrary, the material still contains more or less big pieces of wood not yet totally rotten. In many cases the comminuted material subjected to rotting in stacks contains not only organic material which can rot but also inorganic elements like synthetic plastics or metal.

The present invention relates to the further processing of the material exposed to rotting in stacks for an extended period of time.

It is an object of the invention to provide a sieve device which is specially arranged to sieve out the formed compost from the material contained in such stacks and to separate it from coarse, not rotten, components and from plastic or metal pieces.

According to the invention this object is achieved by
(a) a filling funnel for feeding the material, said filling funnel consisting of a housing open at the top, a first conveyer belt running on the bottom of said housing,
(b) a sieve drum open at both ends, the axis of said sieve drum extending parallel to the conveying direction of said first conveyer belt, the first conveyer belt, in operation, projecting on one side thereof, into said sieve drum.
(c) driving means arranged to impart to the sieve drum rotary movement about its axis,
(d) means for transporting the material along the sieve drum from one side to the opposite other side during said rotary movement,
(e) a second conveyer belt running below the sieve drum for carrying out the earth falling through the sieve drum and
(f) means for carrying out the elements of the material retained by the sieve drum.

Modifications of the invention are the subject matter of the sub-claims.

An embodiment of the invention will now be described in greater detail with reference to the accompanying drawings.

The sieve device has a chassis 10 with rear wheels 12 and front wheels 14. The front wheels 14 are steerable. For this purpose the front wheels 14 are mounted in a steering support 16. The steering support 16 is rotatably mounted around a vertical axis 20 in a life ring 18 on the chassis 10. The chassis 10 is arranged to be coupled with a tractor vehicle through a coupling device 22 engaging the steering support 16.

Figure 1:
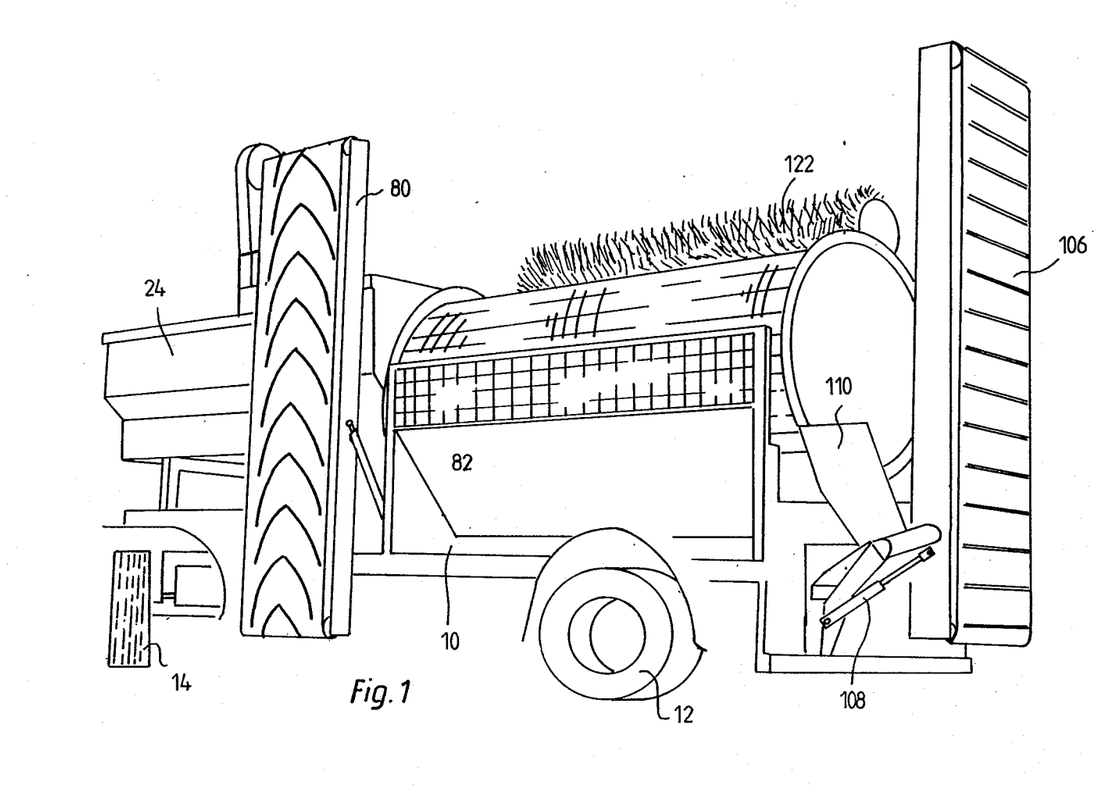
FIG. 1 is a perspective illustration of a sieve device according to the invention.
Figure 2:
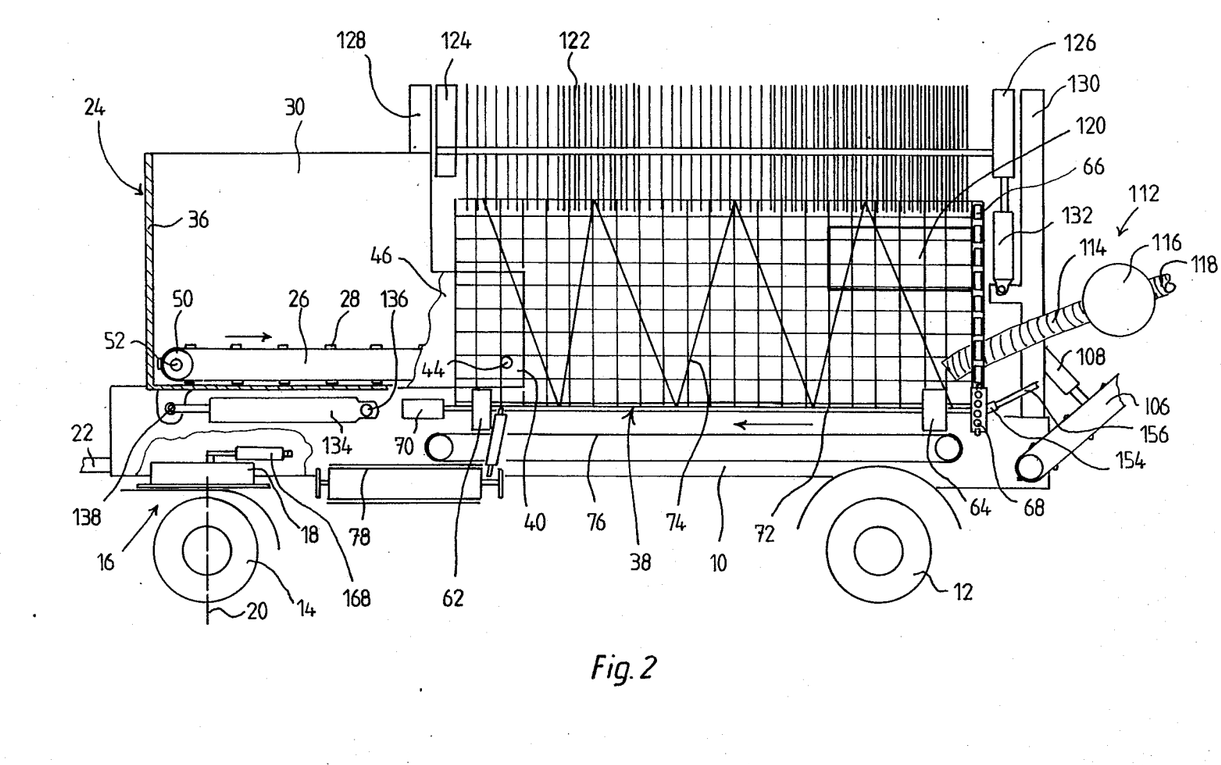
FIG. 2 is a schematic side-elevation of the sieve device.

A filling funnel 24 for feeding the material is arranged on the chassis 10 at the front end thereof, i.e. on the left side in FIGS. 1 and 2. The filling funnel 24 consists of a housing open on top and rectangular in plan view. A first conveyer belt 26 having transversely extending conveying ledges 28 runs on the bottom of this housing longitudinally of the apparatus, i.e. conveying from the left side to the right side in FIG. 2. The filling funnel 24 forms a rectangular filling opening 30. One side wall 32 of two opposite side walls 32 and 34 of the filling funnel 24 is vertical. The opposite side wall 34 extends obliquely downwards. Both opposite side walls 32 and 34 are parallel to the conveying direction of the first conveyer belt 26, and consequently extend in longitudinal direction. At its front end, the filling funnel 24 is closed by a vertical end wall 36.

The described formation of the filling funnel 24 ensures removal of the material fed. If two opposite side walls of the filling funnel were oblique, the material portions directed along both side walls inwardly would slide against each other and form a bridge, which is supported on both sides on the oblique side walls. The conveyer belt beneath would run empty. In an arrangement of the described mode, in which one side wall 32 is vertical, this cannot happen. The material slides along the vertical side wall 32 downwards onto the conveyer belt 26 and is transported away, whereby the material of the oblique side wall 34 can slip down.

Figures 3, 7:
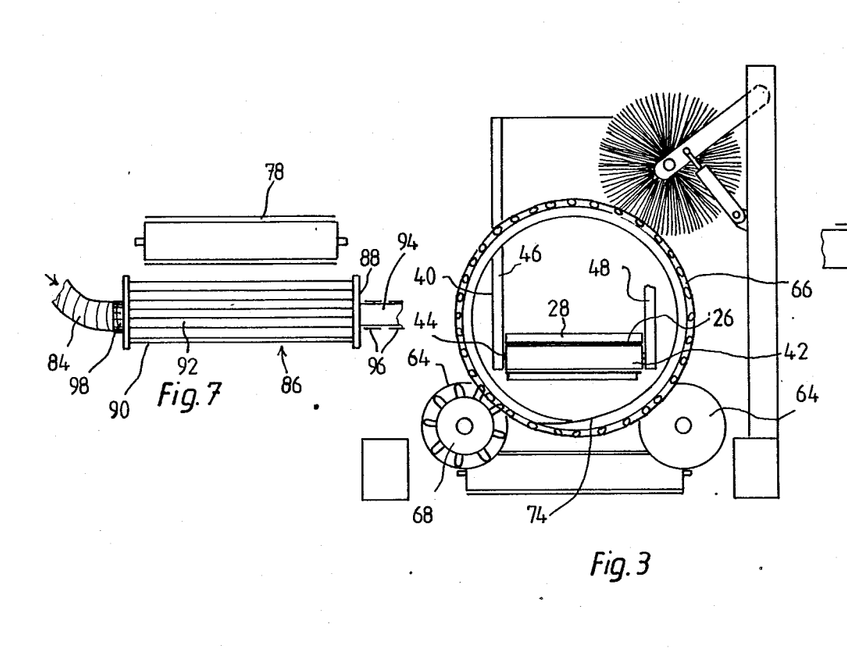
FIG. 3 is a schematic end view of the sieve device from the right side in FIG. 2.
FIG. 7 shows a view from the right side in FIG. 6, here right conveyer belt being omitted.
Figure 9:
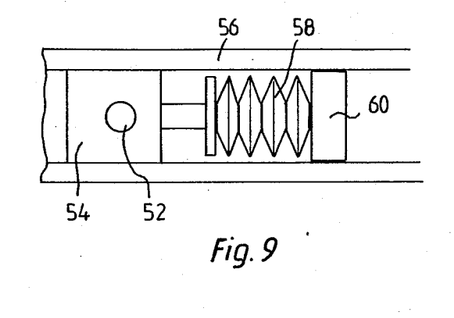
FIG. 9 shows an arrangement for tensioning the conveyer belt in the filling funnel.

A sieve drum 38 open at both ends is located on the chassis 10 behind the filling funnel 24. The axis of the sieve drum 38 is parallel to the conveying direction of the first conveyer belt 26, and consequently extends in longitudinal direction of the apparatus. In operation the first conveyer belt 26 projects into the front end, left end in FIG. 2, of the sieve drum 38. The conveyer belt 26 runs at its right end in FIG. 2 in a portion 40 of the filling funnel 26. This portion is u-shaped in cross section and open to the right side in FIG. 2. At the right end the conveyer belt is guided over a roller 42 (FIG. 3). The roller 42 is mounted with a shaft 44 (FIGS. 2 and 3) in the vertical side walls 46 and 48 of the portion 40. At its left end in FIG. 2 the first conveyer belt 26 is guided over a roller 50. The roller 50 is mounted with a shaft 52 (FIGS. 2 and 9) in bearing parts 54. The bearing parts 54 are guided longitudinally movably in guiding devices 56 on the chassis 10. They are biased by cup springs 58 which are supported on an abutment 60 fixed to the chassis (FIG. 9). Thereby the first conveyer belt 26 is constantly kept tightened without adjustment of the belt tension being necessary.

The sieve drum 38 is rotatably mounted on two pairs of rollers 62 and 64. In FIG. 2 only one roller of each pair is visible. The rollers 62 and 64 are freely rotatably mounted and have no driving function. For driving the sieve drum 38 a toothing 66 is attached to the sieve drum 38. The toothing 66 is formed by a chain laid around the periphery of the sieve drum 38 at its rear end and welded thereto. A wheel 68 provided with teeth in the form of a sprocket wheel is in engagement with the toothing 66. The wheel 68 is driven by a hydraulic motor 70 through a shaft 72. The hydraulic motor 70, the shaft 72, the wheel 68 and the toothing 66 form driving means through which rotation around its axis can be imparted to the sieve drum 38.

The sieve drum 38 comprises means for transporting the material along the sieve drum 36 from the one side, left side in FIG. 2, to the opposite other side during rotation. These means for transporting the material are formed by a helical conveying ledge 74 arranged on the inner side of the sieve drum 38. In practice it has been found very advantageous if the height of this conveying ledge 74 is about ten centimeters. Upon rotation of the sieve drum 38 the material at first is taken along through a distance in the circumferential direction, then slides back to the deepest point, respectively, of the sieve drum 38 and thereby is moved in the direction towards the rear end of the sieve drum 38 by the conveying ledge 74 extending at an angle. Thereby a certain overflow occurs: Part of the material falls back onto the inlet side, the left side in FIG. 2, of the respective section of the conveying ledge 74 and thus reduces the material flow or the average speed of the material by the sieve drum 38. If the conveying ledge 74 is too high the material is transported too fast to the rear end of the sieve drum 38. Then the fine-grained elements of the material, the compost will not be sieved out sufficiently, such that part of the compost is carried out at the rear end of the sieve drum 38 together with the coarse elements, pieces of wood, elements of synthetic material or tins. If the conveying ledge 74 is too narrow, the overflow will become too strong and the coarse elements of the material will be transported too slowly such that a pile-up builds up.

The fine-grained elements of the material mainly consist of compost formed by rotting organic material. These fine-grained elements fall through the sieve openings of the sieve drum 38 onto a second conveyer belt 76 when the material migrates. This second conveyer belt 76 runs, as the arrow indicates in FIG. 2, from the right side to the left side in FIG. 2. The fine-grained material falls from the second conveyer belt 76 onto a third conveyer belt 78. The third conveyer belt 78 is arranged below the end of the second conveyer belt 76 on the side of the filling funnel and conveys material at an angle to the conveying direction of the second conveyer belt 76. A fourth conveyer belt 80 (FIGS. 1 and 6) is arranged below the outlet end of the third conveyer belt 78. In operation the fourth conveyer belt 80 is directed obliquely upwards, projects laterally from the sieve device, and heaps up the sieved material. As can be seen best from FIG. 1, the fourth conveyer belt 80 is pivoted at the chassis 10 and pivotable for upward movement into a vertical position by a hydraulic servo-motor 82 in the form of a hydraulic cylinder. This position rotated upwards is shown in FIG. 1. The position rotated upwards serves to permit transport of the sieve device also on the street.

A blow-out device 86 connected to a blower (not illustrated) through a hose 84 is provided between the third conveyer belt 78 and the fourth conveyer belt 80. The fine-grained elements of the material sieved out comprise also undesirable elements, like pieces of plastic foils, plastic particles etc., in addition to the desired compost. It has been found that such undesirable elements are essentially lighter than the relative heavy compost. Such light elements are blown out of the sieved material by the blow-out device.

Figure 6:
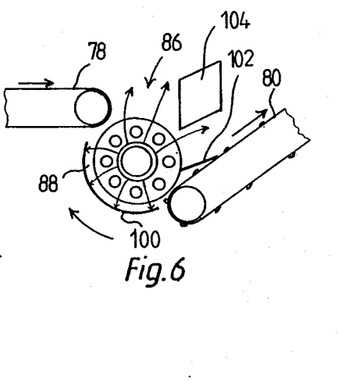
FIG. 6 schematically shows a blow-out device by means of which light pieces of synthetic material which have fallen through the sieve together with the compost are blown out of this compost by an air current.

As can be seen from FIGS. 6 and 7 the blow-out device 86 is located below the outlet end of the third conveyer belt 78. The blow-out device 86 has a drum 88 the peripheral surface of which is formed by parallel rods 90. Small air escape slots 92 are formed between the rods 90. The drum 88 is mounted with a shaft 94 on one side in bearings 96. On the side of the drum 88 remote from the bearings 96 the interior of the drum 88 is connected to the hose 84 through a rotatable connection 98 coaxial to the drum 88. Thus a blower air current is blown out of the hose 84 into the interior of the drum 88, as indicated by an arrow in FIG. 7. The drum 88 is driven about its axis, which extends at an angle to the conveying direction of the third and fourth conveyer belts 78 or 80, respectively. The peripheral speed of the drum is higher than the transporting speed of the third conveyer belt. A covering 100 is provided on the lower circumferential section of the drum 88 between the third and fourth conveyer belt 78 or 80, respectively. This covering covers the air escape slots 92 there. A stripper 102 resiliently engages the drum 88 and the fourth conveyer belt 80.

The sieved material is thrown onto the drum 88 by the third conveyer belt 78 and taken along thereby to the fourth conveyer belt 80. Because the peripheral speed of the drum is essentially higher than the conveying speed of the third conveyer belt 78, a relatively thin layer of the sieved material is formed on the drum 88 on the way to the fourth conveyer belt 80. This thin layer is blown through by air currents, which escape through the air escape slots 92. Thereby the relatively heavy compost keeps lying and is taken along by the drum 88 to the fourth conveyer belt 80, while light elements, in particular synthetic material, are blown away. Suitable means, in the form of air guiding plates 104, for example, can be provided to laterally deviate the elements blown away.

In this way pure compost is obtained, from which coarse elements are removed by the sieve drum 38 and from which foreign particles are removed by the blow-out device 86. The fifth conveyer belt 106 receives the coarse material, which has not fallen through the sieve openings of the sieve drum 38, and emerges from the sieve drum 38. A straight continuous material flow of this coarse material without any deflections from the filling funnel 24 with the first conveyer belt 26 through the sieve drum 38 to the fifth conveyer belt 106 is achieved. This straight continuous material flow is very advantageous if the fed material contains long elements like boughs or long bands. Such elements are guided straight through the sieve device without getting jammed or ravelled. Also the fifth conveyer belt 106 is pivoted at the chassis 10 and is pivotable for upward movement into a vertical position by a hydraulic servomotor 108 in the form of a hydraulic cylinder for the transport. In FIG. 1 the fifth conveyer belt 106 is illustrated in this vertical position. Air guiding plates 110 (FIG. 1) serve to guide the material emerging from the sieve drum 38 safely onto the fifth conveyer belt 106.

A suction device 112 is arranged at the right outlet end, right end in FIG. 2, of the sieve drum 38. The suction device 112 serves to suck off light elements like plastic bags in the elements of the material retained by the sieve drum. The suction device 112 comprises a suction hose 114 which is introduced into the end of the sieve drum 38 and a suction blower 116. The elements sucked off are conveyed into a refuse tank (not illustrated) through a hose 118. Further, a metal separator 120 is arranged in the end of the sieve drum 38. Such metal separators are known per se. Therefore the metal separator is illustrated only schematically.

The metal separator 120 removes tins or similar foreign bodies from the material. The material falling onto the fifth conveyer belt 106 then contains only coarse organic parts like pieces of wood. These pieces are heaped up by the fifth conveyer belt 106. They can be used to "inject" the stacks and to accelerate the rotting thereof. Such pieces of wood, which were already exposed to rotting for an extended period of time, are rich cultures of bacterias which promote rotting.

A brush roll 122 is arranged above the sieve drum 38. This brush roll 122 serves to clean the sieve drum 38 continuously during its rotation and to keep the sieve openings open. The brush roll 122 is mounted in arms 124,126. The arms 124 and 126 are pivoted on supports 128 or 130, respectively. The arms 124,126 are rotatable by a hydraulic servomotor 132 in the form of a hydraulic cylinder. In this way, on one hand, the exact hight of the brush roll 122 relative to the sieve drum 38 can be adjusted. If the brush roll 122 extends too deeply into the sieve drum 38, it is subjected to exessive wear. But if the brush roll is lifted too far, the cleaning of the sieve drum 38 is imperfect. But the hydraulic servomotor 132, on the other hand, has also the task to lift off the brush roll 122 completely from the sieve drum 38 and to rotate it upwards. Then the sieve drum 38 is freely supported on the rollers 62 and 64.

The filling funnel 24 is guided longitudinally movably on the chassis 10. An hydraulic servomotor 134 engages the filling funnel 24. The hydraulic servomotor 134 is a hydraulic cylinder which, on one hand, engages the chassis 10 at 136 and, on the other hand, engages the filling funnel 24 at 138. The filling funnel 24 can be shifted by the servomotor 134 to the left in FIG. 2 until the portion 40 of the filling funnel 24 is completely drawn out from the sieve drum 38.

Now the sieve drum 38 can easily be rolled down from the rollers 62 and 64. Thereby the sieve drum 38 can be replaced by another sieve drum having another mesh width.

Figure 8:
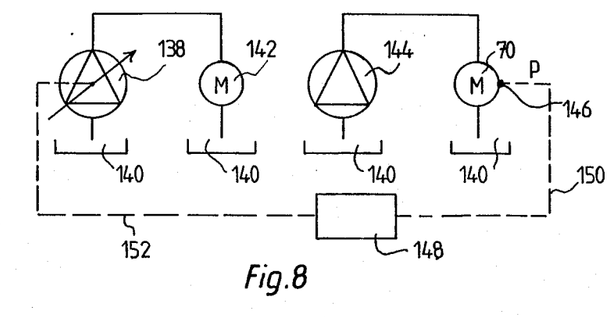
FIG. 8 schematically shows the control of the conveyer belt in the filling funnel depending on the charge of the sieve drum.

If the material to be sieved is fed too fast into the filling funnel 24, a pile-up in the sieve drum 38 can result. This becomes apparent by the torque to be exerted by the hydraulic motor 70 for rotating the sieve drum and thus also the pressure in the hydraulic motor 70 increasing. This increase of pressure is used to reduce the speed of the first conveyer belt 26. Thereby the quantity of material is reduced, which is delivered from the filling funnel 24 to the sieve drum 38 until the sieve drum 38 operates again with normal load. The increase of the material in the filling funnel 24 attached thereto very quickly signals the overload to the user and prevents further feeding of material. This control will now be described with reference to FIGS. 4 and 8.

Figure 4:
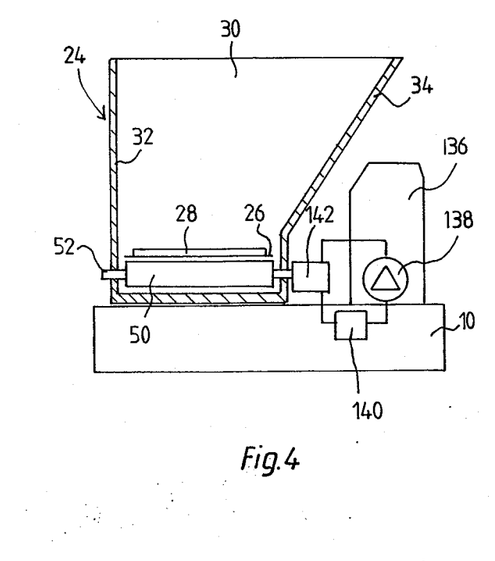
FIG. 4 schematically shows a cross sectional view of the filling funnel in the sieve device of FIG. 2.

An internal-combustion engine 136 (FIG. 4), generally a diesel engine, is arranged on the chassis 10. This internal-combustion engine 136 drives hydraulic pumps for the different hydraulic circuits. In FIG. 4 a hydraulic pump 138 formed as an axial piston pump with variable volumetric displacement is illustrated. This hydraulic pump sucks in oil from a sump 140 and supplies it to a hydraulic motor 142. The depressurized oil from the hydraulic motor 142 flows back into the sump 140. The hydraulic motor 142 is coupled with the roller 50 of the first conveyer belt 26 and drives the conveyer belt 26 through this roller 50. By varying the delivery of the hydraulic pump 138 the speed of the hydraulic motor 142 and therewith of the conveyer belt 26 can be varied.

A second hydraulic pump 144 not illustrated in FIG. 4 is driven by the internal-compustion engine 136. The hydraulic pump 144 sucks in oil from the sump 140 and supplies it to the hydraulic motor 70 (FIG. 2), which drives the sieve drum 38 through the shaft 72, the wheel 68 and the toothing 66. The working pressure p of the hydraulic motor 70 is picked off by means of a pressure sensor 146. The signal of the pressure sensor 146 is applied to a controller 148, as illustrated by the dotted line 150 in FIG. 8. If the pressure p measured by the pressure sensor 146 exceeds a given value the delivery of the hydraulic pump 138 is reduced. This is illustrated by the dotted line 152 in FIG. 8. Thus the hydraulic pump in the "filling funnel circuit" is controlled by the pressure p in the "sieve drum circuit". The hydraulic pump 70 also drives the fifth conveyer belt 106 through a link 154 and a shaft 156.

The sieve device with the chassis 10 and wheels 12,14 is pulled by a tractor vehicle for the transport from one operational site to another. But generally it is necessary to move the sieve device at the operational site by small distances. This is the case, for example, if a heap of a certain hight of compost has been deposited and the sieve device has to be moved forwards in order to deposite a new heap next to the deposited heap. It would be very burdensome if a tractor vehicle would always have to be used. Then it also would not be possible to operate the sieve device with only one operator, as desired.

Figure 13:
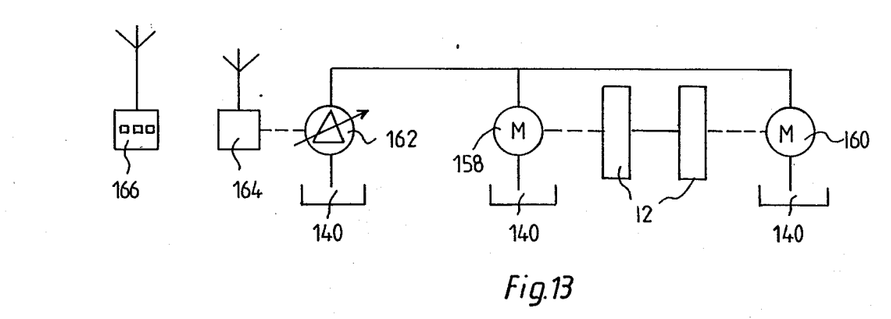
FIG. 13 shows a travelling drive for the sieve device operable by remote control.

For this reason driving wheels of the movable chassis 10, namely the wheels 12, are arranged to be optionally driven by one or more hydraulic motors 158,160 (FIG. 13). The hydraulic motors 158 and 160 are fed by a hydraulic pump 162 driven by the internal-combustion engine 136. The hydraulic pump 162, is an axial piston pump of adjustable delivery. The delivery of the hydraulic pump 162 can be varied through a radio control having a receiver 164 provided at the sieve device and a transmitter 166 arranged to be operated by the operator.

In this way the internal-combustion engine 136 on the sieve device is also used in order to effect little changes of location of the sieve device at the operational site. By using a radio control it is achieved, on one hand that no driver seat for the operator has to be provided, and on the other hand, the operator does not have to operate any control elements directly at the apparatus when moving the sieve device. The operation can occur from a distance whereby the danger of accidents is decreased. The operator also can always place himself such that he can optimally observe the movement of the sieve device to be made.

Occasionally it can be necessary that the sieve device is also steered during such changes of location at the operational site. Using a tractor vehicle this steerage occurs through the coupling device 22 engaging the steering support. In order to make a one-man operation possible also for the steerage, a hydraulic servomotor 168 in the form of a hydraulic cylinder is provided. This hydraulic servomotor engages the steering support 16 and is arranged to be supplied with pressurized liquid through a control unit 170 (FIG. 5).

Figure 5:
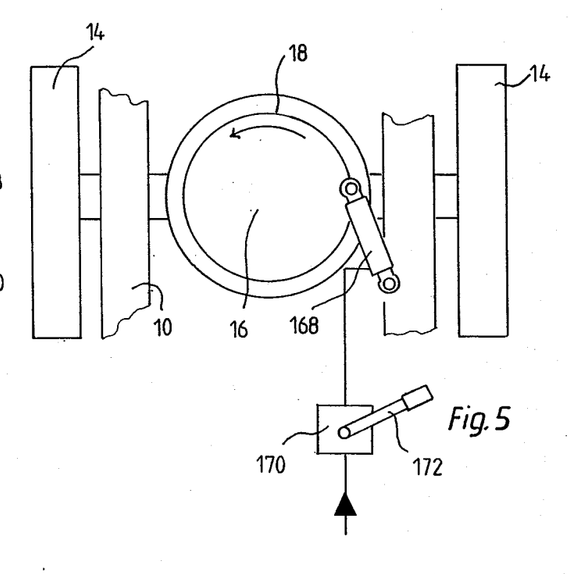
FIG. 5 illustrates an embodiment of a hydraulic steerage for the movable and steerable chassis of the sieve device.

In the arrangement according to FIG. 5 a control unit 170 arranged to be manually operated by means of a lever 172 is provided. Instead of this the control unit it can also be operated by a remote control. Such an arrangement is schematically illustrated in FIG. 14.

Figure 14:
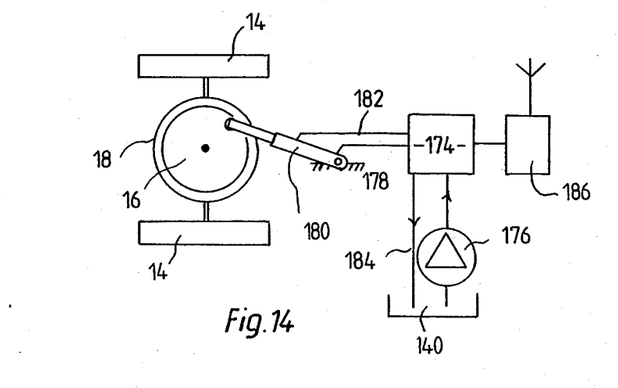
FIG. 14 shows a steerage operable by remote control.

In the arrangement according to FIG. 14, the control unit is a slide valve control optionally through which pressurized oil is directed by a hydraulic pump 176 through a conduit 178 into a hydraulic cylinder 180 on one side of a double acting piston, while the hydraulic cylinder on the other side of the double acting piston is connected through conduits 182 and 184 to the sump 140, or the conduit 178 is connected through condudit 184 to the sump 140 and the conduit 182 with the corresponding side of the double acting piston is supplied with pressurized oil. The control unit 174 is steerable into one or into the other of these slide valve positions, or into a neutral position by the receiver 186 of a radio control. In the neutral position both conduits 178 and 182 are locked and the hydraulic pump 176 is connected to the sump 140 through the condudit 184.

In this way the steering support 16 can be rotated, by remote control, if required, with hydraulic servo-power and thus the sieve device can also be steered.

Instead of a radio control, any other remote control, for example infrared control, can be provided.

In FIG. 2 a sieve drum 38 having one single drum body is illustrated. If another size of the sieve openings is required the drum body is released by means of the described mechanism and rolled down from the bearing rollers 62,64 and is replaced by another drum body.

Figure 10:
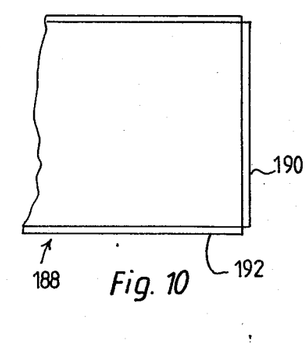
FIG. 10 schematically shows a sieve drum consisting of two telescoping drum bodies which can be shifted against each other or rotated, if required, to change the effective sieve openings.
Figure 11:
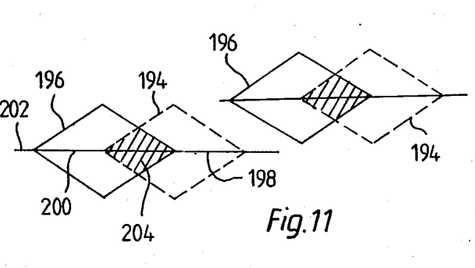
FIG. 11 shows an embodiment of the sieve openings in the drum bodies of FIG. 10.
Figure 12:
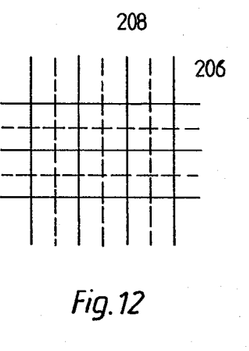
FIG. 12 shows another embodiment of the sieve openings in the drum bodies of FIG. 10.

FIGS. 10,11 and 12 show other possibilities of changing the sieve openings.

As schematically illustrated in FIG. 10 the sieve drum 188 consists of a pair of drum bodies 190 and 192, the one drum body 190 of which is telescoped in the other drum body 192. Each of the drum bodies 190,192 has sieve openings. Both drum bodies 190,192 are adjustable against each other such that the sieve openings overlap to different degrees. There are different possibilities to achieve this.

In the embodiment according to FIG. 11 both drum bodies 190,192 have corresponding diamond-shaped sieve openings 194 or 196, respectively. The sieve openings 194 of the drum body 190 are illustrated by dotted lines. A diagonal 198,200 of each sieve opening 190 or 192, respectively, extends in the axial direction of the sieve drum 188, i.e. horizontally in FIG. 11. The drum bodies 190,192 are arranged to each other such that the axial diagonal 198,200 of sieve openings 194 or 196, respectively, belonging together are each located on one generating line 202 of the sieve drum 188. Both drum bodies 190 and 192 are axially adjustable against each other.

In such an axial adjustment of both drum bodies 190 and 192 against each other the overlap of the sieve openings 194 and 196 changes and thus the size of the effective free sieve opening 204. This free sieve opening 204 is illustrated in FIG. 11 in dotted lines. It can be seen that in this way the size of the free sieve opening 204 can be continuously changed between zero and the whole surface of the sieve openings 194 and 196, the form of the sieve openings, however, remaining diamond-shaped.

Another embodiment is illustrated in FIG. 12.

In FIG. 12 both drum bodies 190 and 192 form a grid 206 or 208, respectively, the grid 206 of the drum body 190 being illustrated again by dotted lines. Each of the grids 206 and 208 has square sieve openings. The drum bodies 190 and 192 are optionally movable in axial direction from a first position, in which the sieve openings are aligned to a second position, which is displaced by half a side length of the sieve opening relative to the first position. Such a displacement of the drum bodies 190 and 192 leads to effective sieve openings, the surface of which has half of the surface of the original sieve openings. However these effective sieve openings have elongated rectangular shape. Therefore both drum bodies 190 and 192 are adjustable by half a side length of the sieve opening from the first position into the second position and, at the same time, are rotatable in circumferential direction by the same amount. Then the configuration illustrated in FIG. 12 results. The effective sieve openings are quadratic again. But there surfaces are reduced to a quarter.

The arrangement according to FIG. 12 indeed does not permit a continuous change of the free sieve openings from zero to maximum, like the arrangement according to FIG. 11, but it offers the advantage that the total surface of all sieve openings is larger than in the arrangement according to FIG. 11, and that this total surface remains essentially unchanged when the size of each individual sieve openings is changed.

I claim:

1. Sieve device for sieving out compost of rotten organic waste comprising:

(a) a filling funnel for feeding organic waste, said filling funnel consisting of a housing having a rectangular filling opening at the top and two opposite sidewalls, one sidewall being vertical and the other sidewall extends obliquely downwards, said vertical sidewall preventing organic waste from forming bridges in the filling funnel, a first conveyer belt running on the bottom of said housing for conveying organic waste dropping thereon from said housing and for turning elongated objects in organic waste to extend substantially longitudinally of said conveyer belt, (b) a sieve drum open at both ends, the axis of said sieve drum extending parallel to the conveying direction of said first conveyer belt, the first conveyer belt in operation, projecting on one side thereof, into said sieve drum, (c) driving means arranged to impart to the sieve drum rotary movement about its axis, (d) means for transporting the organic waste along the sieve drum from one side to the opposite other side during said rotary movement, (e) a second conveyer belt running below the sieve drum for carrying out earth falling through the sieve drum, and (f) means for carrying out elements of the organic waste retained by the sieve drum.

2. Sieve device as set forth in claim 1, characterized in that (a) the second conveyer belt (76) conveys the organic waste falling through the sieve drum (38) in the direction of the filling funnel (24), (b) a third conveyer belt (78) is arranged below the end of the second conveyer belt (76) on the side of the filling funnel and conveys the organic waste at an angle to the conveying direction of the second conveyer belt (76) and (c) a fourth conveyer belt (80) is arranged below the outlet end of the third conveyer belt (78), projects laterally from the sieve device and heaps up the organic waste.

3. Sieve device as set forth in claim 2, characterized in that a blow-out device (86) connected to a blower is provided between the third and the fourth conveyer belt (78, or 80, respectively) which blow-out device blows out light elements like synthetic plastics from the organic waste.

4. Sieve device as set forth in claim 2, characterized in that a fifths conveyer belt (106) arranged in the extension of the sieve drum (38) is arranged on said other side of the sieve drum (38) below the sieve drum (38) as means for carrying out the elements of the organic waste retained by the sieve drum.

5. Sieve device as set forth in claim 4, characterized in that a suction device (112) is arranged on said other side of the sieve drum (38) for sucking off light parts like plastic bags in the organic waste retained by the sieve drum (38).

6. Sieve device as set forth in claim 4, characterized in that a metal separator (120) is provided on said other side of the sieve drum (38).

7. Sieve device as set forth in claim 1, characterized in that said opposite side walls (32,34) are parallel to the conveying direction of the first conveyer belt (26).

8. Sieve device as set forth in claim 1, characterized in that the means for transporting the organic waste along the sieve drum (38) is formed by a helical conveying ledge (74) arranged on the inner side of the sieve drum (38).

9. Sieve device as set forth in claim 8, characterized in that the height of the conveying ledge (74) is about ten centimeters.

10. Sieve device as set forth in claims 1, characterized in that the filling funnel (24) and the sieve drum (38) are attached to a movable and steerable chassis (10).

11. Sieve device as set forth in claim 10, characterized in that two additional conveyer belts (80,106) are pivoted at the chassis (10) and are pivotable for upward movement into a vertical position by hydraulic servo motors (82 or 108, respectively).

12. Sieve device as set forth in claim 10, characterized in that the sieve device on the movable and steerable chassis (10) is arranged to be coupled to a tractor vehicle.

13. Sieve device as set forth in claim 10, wherein an internal-combustion engine (136) is arranged on the chassis (10) for driving hydraulic pumps (138,144), one said pump supplies a hydraulic motor for driving the first conveyer belt and said other hydraulic pump supplies a hydraulic motor for driving the sieve drum.

14. Sieve device as set forth in claim 13, characterized in that driving wheels (12) of the movable chassis (10) are driven by hydraulic motors (158,160), which are fed by a hydraulic pump (162) driven by the internal-combustion engine (136).

15. Sieve device as set forth in claim 14, including remote control means wherein the hydraulic drive of the driving wheels (12) are operable by said remote control means.

16. Sieve device as set forth in claim 10, characterized in that (a) a steering support (16) having a pair of wheels (14) is rotatably mounted through a live ring (18) about a vertical axis (20) on the chassis (10) and (b) a hydraulic servomotor (168,180) engages the steering support (16) and is arranged to be supplied to pressurized liquid through a control unit (170,174).

17. Sieve device as set forth in claim 16, including remote control means wherein the control unit (174) is operable by said remote control means.

18. Sieve device for sieving out compost of rotten organic material, characterized by (a) a filling funnel for feeding the material, said filling funnel consisting of a housing open at the top, a first conveyer belt running on the bottom of said housing, (b) a sieve drum open at both ends, the axis of said sieve drum extending parallel to the conveying direction of said first conveyer belt, the first conveyer belt, in operation, projecting on one side thereof, into said sieve drum.

(c) driving means arranged to impart to the sieve drum rotary movement about its axis, (d) means for transporting the material along the sieve drum from one side to the opposite other side during said rotary movement, (e) the driving means for driving the sieve drum (38) have a first pump (144) which is driven by an engine (136) and a first hydraulic motor (70) fed by the first pump (144), (f) the first conveyer belt (26) is driven by a second hydraulic motor (142) which is fed by a second pump (138) and is also driven by the engine (136), the second pump (138) having means for varying its volumetric displacement, (g) a pressure sensor (146) is provided which responds to the working pressure of the first hydraulic motor (70), (h) a controller (148) receives the signal of the pressure sensor (146), (i) the means for varying the volumetric displacement of the second pump (138) is capable of reducing the delivery of the second pump (138) to a smaller value, if the working pressure (p) of the first hydraulic motor (70) picked-up by the pressure sensor exceeds a given value, (j) a second conveyer belt running below the sieve drum for carrying out earth falling through the sieve drum and (k) means for carrying out elements of the material retained by the sieve drum.

19. Sieve device for sieving out compost of rotten organic material, comprising:

(a) a filling funnel for feeding the material, said filling funnel consisting of a housing open at the top, a first conveyer belt running on the bottom of said housing, and servomotor means for slidingly guiding the filling funnel in a direction parallel to the axis of the sieve drum, including means for guiding the funnel so that the conveyer belt is completely retracted from the sieve drum, (b) a sieve drum open at both ends, the axis of said sieve drum extending parallel to the conveying direction of said first conveyer belt, the first conveyer belt, in operation, projecting on one side thereof, into said sieve drum.

(c) driving means arranged to impart to the sieve drum rotary movement about its axis, (d) means for transporting the material along the sieve drum from one side to the opposite other side during said rotary movement, (e) a second conveyer belt running below the sieve drum for carrying out earth falling through the sieve drum, and (f) means for carrying out elements of organic material retained by the sieve drum.

20. Sieve device as set forth in claim 19, characterized in that the sieve drum (38) is rotatably mounted on two pairs of rollers (62,64).

21. Sieve device as set forth in claim 20, characterized in that (a) the rollers (62,64) are freely rotatable and (b) a toothing (66) is arranged on the sieve drum (38) as driving means and engages a motor-driven wheel (68) provided with teeth.

22. Sieve device as set forth in claim 21, characterized in that (a) the toothing (66) is formed by a chain laid around the circumference of the sieve drum (38) and welded thereto and (b) the wheel (68) provided with teeth is a sprocket wheel.

23. Sieve device for sieving out compost of rotten organic material, characterized by (a) a filling funnel for feeding the material, said filling funnel consisting of a housing open at the top, a first conveyer belt running on the bottom of said housing, (b) a sieve drum open at both ends, the axis of said sieve drum extending parallel to the conveying direction of said first conveyer belt, the first conveyer belt, in operation, projecting on one side thereof, into said sieve drum.

(c) driving means arranged to impart to the sieve drum rotary movement about its axis, (d) means for transporting the material along the sieve drum from one side to the opposite other side during said rotary movement, (e) the sieve drum (188) comprises a pair of telescoping drum bodies (190,192), (f) each of the drum bodies (190,192) has sieve openings, (g) means for adjusting both drum bodies (190,192) against each other, such that the sieve openings overlap to variable extent, (h) a second conveyer belt running below the sieve drum for carrying out earth falling through the sieve drum and (i) means for carrying out elements of the material retained by the sieve drum.

24. Sieve device as set forth in claim 23, characterized in that (a) both drum bodies (190,192) have identical diamond-shaped sieve openings (194,196), one diagonal (198,200) of which extends in axial direction.

(b) the drum bodies (190,192) are arranged to each other such that the axial diagonals (198,200) of associated sieve openings (194,196) are located on one common generatrix (202) of the sieve drum (188) and (c) both drum bodies (190, 192) are axially adjustable against each other.

25. Sieve device as set forth in claim 23, characterized in that (a) both drum bodies (190,192) form a grid (206,208) having square sieve openings and (b) the means for adjusting drum bodies (190,192) are adjustable to move the drum bodies in the axial direction from a first position, in which the sieve openings are in alignment, into a second position, which is displaced by half a side length of the sieve opening relative to the first position.

26. Sieve device as set forth in claim 25, characterized in that the means for adjusting both drum bodies (190,192) from the first into the second position includes means for rotating the drum bodies (190,192) by half a side length of the sieve opening in the circumferential direction.

27. Sieve device for sieving out compost of rotten organic material, characterized by (a) a filling funnel for feeding the material, said filling funnel consisting of a housing open at the top, a first conveyer belt running on the bottom of said housing, (b) a sieve drum open at both ends, the axis of said sieve drum extending parallel to the conveying direction of said first conveyer belt, the first conveyer belt, in operation, projecting on one side thereof, into said sieve drum.

(c) driving means arranged to impart to the sieve drum rotary movement about its axis, (d) means for transporting the material along the sieve drum from one side to the opposite other side during said rotary movement, (e) a second conveyer belt running below the sieve drum for carrying out earth falling through the sieve drum in the direction of the filling funnel (24), (f) a third conveyer belt (78) is arranged below the end of the second conveyer belt (76) on the side of the filling funnel and conveys material at an angle to the conveying direction of the second conveyer belt (76) and, (g) a fourth conveyer belt (80) is arranged below the outlet end of the third conveyer belt (78), projects laterally from the sieve device and heaps up the material, (h) a blowout device (86) connected to a blower is provided between the third and fourth conveyer belt (78 or 80, respectively), said blowout device having a drum (88) below the end of the third conveyer belt, the peripheral surface of which drum is formed by rods (90) parallel to each other, between which rods small air escape slots (92) are located, said drum (88) is driven about its axis extending at an angle to the conveying direction of the third and fourth conveyer belts (78 or 80, respectively) and a blower air current passed into the interior of the drum (88) whereby light elements of the material like synthetic plastics are blown away while heavy elements like earth are taken along by the drum (88) onto the fourth conveyer belt (80).

28. Sieve device as set fourth in claim 27 further including means (104) for laterally deviating the light elements blown away.

29. Sieve device for sieving out compost of rotten organic material out of stacks of organic waste comprising:

(a) a filling funnel for feeding organic waste, said filling funnel consisting of a housing having a rectangular filling opening at the top and two opposite sidewalls, one sidewall being vertical and the other sidewall extends obliquely downwards, said two opposite sidewalls being cooperative to prevent said organic waste from forming bridges in said filling funnel, a first conveyer belt running on the bottom of said housing for conveying organic waste dropping thereon from said housing and for turning elongated objects in organic waste to extend substantially longitudinally of said conveyer belt, (b) a sieve drum open at both ends, the axis of said sieve drum extending parallel to the conveying direction of said first conveyer belt, the first conveyer belt, in operation, projecting on one side thereof, into said sieve drum, said sieve drum being rotatably mounted on freely rotatable rollers to permit unobstructed passage of bulky components of organic waste, (c) (i) sieve drum driving means comprising toothing arranged to impart to the sieve drum rotary movement about its axis, (ii) said toothing being engaged by a motor-driven toothed wheel arranged to impart to the sieve drum rotary movement about its axis even when heavy parts from organic waste are supplied to said sieve drum, (d) means for transporting organic waste along the sieve drum from one side to the opposite other side during said rotary movement, (e) a second conveyer belt running below the sieve drum for carrying out earth falling through the sieve drum, and (f) means for carrying out elements of organic waste retained by the sieve drum.

30. Sieve Device for sieving out compost of rotten organic material out of stacks of organic waste comprising:

(a) a filling funnel for feeding organic waste, said filling funnel consisting of a housing having a rectangular filling opening at the top and two opposite sidewalls, one sidewall being vertical and the other sidewall extends obliquely downwards, said two opposite sidewalls being cooperative to prevent said organic waste from forming bridges in said filling funnel, a first conveyer belt running on the bottom of said housing for conveying organic waste dropping thereon from said housing and for turning elongated objects in organic waste to extend substantially longitudinally of said conveyer belt, and servomotor means for slidingly guiding the filling funnel in a direction parallel to the axis of the sieve drum, including means for guiding the funnel so that the conveyer belt is completely retracted from the sieve drum, (b) a sieve drum open at both ends, the axis of said sieve drum extending parallel to the conveying direction of said first conveyer belt, the first conveyer belt, in operation, projecting on one side thereof, into said sieve drum, said sieve drum being rotatably mounted on freely rotatable rollers to permit unobstructed passage of bulky components of organic waste, (c) (i) sieve drum driving means comprising toothing arranged to impart to the sieve drum rotary movement about its axis, (ii) said toothing being engaged by a motor-driven toothed wheel arranged to impart to the sieve drum rotary movement about its axis even when heavy parts from organic waste are supplied to said sieve drum, (d) means for transporting organic waste along the sieve drum from one side to the opposite other side during said rotary movement, (e) a second conveyer belt running below the sieve drum for carrying out earth falling through the sieve drum, and (f) means for carrying out elements of organic waste retained by the sieve drum.

31. Sieve device as set forth in claim 30, wherein the sieve drum (38) is rotatably mounted on two pairs of rollers (62,64).

32. Sieve device as set forth in claim 29, wherein
(a) the toothing (66) is formed by a chain laid around the circumference of the sieve drum (38) and welded thereto and
(b) the toothed wheel (68) is a sprocket.

33. Sieve device as set forth in claim 29, wherein said opposite sidewalls (32,34) are parallel to the conveying direction of the first conveyer belt (26).

34. Sieve device as set forth in claim 29, wherein the means for transporting organic waste along the sieve drum (38) is formed by a helical conveying ledge (74) arranged on the inner side of the sieve drum (38).

35. Sieve device as set forth in claim 29, wherein
(a) the second conveyer belt (76) having means for conveying earth falling through the sieve drum (38) in the direction of the filling funnel (24),
(b) a third conveyer belt (78) is arranged below the second conveyer belt (76) on the side of the filling funnel and includes means for conveying organic waste at an angle to the conveying direction of the second conveyer belt (76), and
(c) a fourth conveyer belt (80) is arranged below the outlet end of the third conveyer belt (78), projects laterally from the sieve device and heaps up sieved material.

36. Sieve device as set forth in claim 29, wherein the filling funnel (24) and the sieve drum (38) are attached to a movable and a steerable chassis (10).

* * * * *